United States Patent [19]

Fukuda et al.

[11] Patent Number: 4,579,789
[45] Date of Patent: Apr. 1, 1986

[54] CARBONACEOUS FUEL CELL ELECTRODE SUBSTRATE INCORPORATING THREE-LAYER SEPARATOR, AND PROCESS FOR PREPARATION THEREOF

[75] Inventors: Hiroyuki Fukuda; Masatomo Shigeta; Hisatsugu Kaji, all of Iwaki; Kuniyuki Saitoh, Abiko, all of Japan

[73] Assignee: Kureha Kagaku Kogyo Kabushiki Kaisha, Tokyo, Japan

[21] Appl. No.: 719,561

[22] Filed: Apr. 3, 1985

[30] Foreign Application Priority Data

Apr. 9, 1984 [JP] Japan .................................. 59-70410
Jul. 4, 1984 [JP] Japan .................................. 59-138558
Jul. 5, 1984 [JP] Japan .................................. 59-140259

[51] Int. Cl.$^4$ .......................................... H01M 4/96
[52] U.S. Cl. ...................................... 429/44; 429/39; 427/115
[58] Field of Search ........................ 429/34, 35, 36, 37, 429/38, 39, 44

[56] References Cited

U.S. PATENT DOCUMENTS

| | | | |
|---|---|---|---|
| 3,188,242 | 6/1965 | Kordesch et al. | 136/86 |
| 4,450,212 | 5/1984 | Feigenbaum et al. | 429/35 |
| 4,505,992 | 3/1985 | Dettling et al. | 429/36 |
| 4,522,895 | 6/1985 | Shigeta et al. | 429/44 |

Primary Examiner—Donald L. Walton
Attorney, Agent, or Firm—Cushman, Darby & Cushman

[57] ABSTRACT

Disclosed herein is an electrode substrate for fuel cells which comprises a three-layer separator and two porous single or double carbonaceous layers. The separator comprises a carbon plate and two flexible graphite sheets. The porous layer has a number of elongated holes for feeding reactant gases into a fuel cell. The elongated holes are provided near the center of the thickness in the porous single layer or in the interface between the porous double layer. The electrode substrate of the present invention exhibits improved properties, such as mechanical strength, thermal and electric resistances and the like, as a fuel cell electrode substrate. The present invention provides processes for preparation of such an electrode substrate.

11 Claims, 8 Drawing Figures

CARBONACEOUS FUEL CELL ELECTRODE SUBSTRATE INCORPORATING THREE-LAYER SEPARATOR, AND PROCESS FOR PREPARATION THEREOF

FIELD OF THE INVENTION

This invention relates to a bipolar electrode substrate for fuel cells in a stack holding an aqueous acid or alkali solution as an electrolyte and to processes for preparation of such an electrode substrate. More particularly, it relates to a fuel cell electrode substrate having a five-layer structure or a seven-layer structure comprising two porous single or double carbonaceous layers as diffusion layers of reactant gases, i.e. a fuel gas and an oxidizing gas, the layers having each a number of elongated holes for feeding the gases into a fuel cell which are provided near the center of the thickness of the porous layer, and a three-layer separator impermeable to the gases which comprises a gastight carbon plate and two flexible graphite sheets and which is interposed between said two diffusion layers, these layers being integrated as a whole body.

BACKGROUND OF THE INVENTION

Heretofore, there have been known fuel cells for use in a stack which utilize an aqueous solution of electrolyte. In such a fuel cell, a unit cell comprises a porous matrix holding the aqueous solution of electrolyte and two porous layers forming each either an anode or a cathode. The porous layers carry catalysts which form two catalyst layers to be in contact with the matrix. Reactant gases diffuse through the porous layers and react electrochemically in the catalyst layers: thus, a three phase gas-catalyst (solid)-electrolyte (liquid) reaction may occur.

These unit cells are separated from one another by a layer of gas impermeable compact material, so that a fuel gas and an oxidizing gas utilized as reactant gases may not be mixed. The constituent elements of such a unit cell are made of corrosion resistant materials, such as carbonaceous materials and corrosion resistant alloys, which can endure the severe operational environment of the fuel cell, for example, acids, alkalies, relatively high temperatures or the like, and which are good conductors of electricity and heat. A fuel cell may be made by stacking several tens to hundreds of such unit cells so that a predetermined voltage and current may be obtained.

Recently, the development of fuel cells and related systems thereof have been demanded for a generator of clean energy or for a freely openable and closable generator to be utilized in the leveling of operations of thermoelectric or hydroelectric power plants or the saving of resources by improving the efficiency of energy.

Substrates of a fuel cell in a stack may be classified into two groups, namely, monopolar and bipolar, depending on the nature and kinds of gas impermeable layers for preventing the mixing of reactant gases and of porous layers as gas diffusion layers.

Bipolar-type electrode substrates comprise a gas impermeable layer and two gas diffusion layers, both of which are integrated with said impermeable layer by adhesion or coupling. Therefore, the thickness of a stack comprising numbers of unit cells can be smaller and, additionally, both electric and thermal contact resistances between the layers can be significantly reduced. Moreover, the mechanical strengths of the stack as well as of the electrode substrate may be markedly higher. Thus, bipolar electrode substrates may be more advantageous to an improvement of the performance of a fuel cell and to compactness of a device, as compared with monopolar electrode substrates.

Bipolar electrode substrates for fuel cells comprising a separator provided with channels for reactant gases are known, wherein the channels are made by ribbing both surfaces of an gas impermeable carbonaceous thin plate.

The present inventors have provided an electrode substrate based on short carbon fibers and having excellent properties, this substrate being provided with channels for reactant gases near the center of a porous carbonaceous layer as a gas diffusion layer. The substrate may be prepared by press molding and heat treatment which are easier than mechanical processes such as ribbing and boring. See Japanese Patent Application Laying Open No. 68170/84.

In the course of preparation of such an electrode substrate, a porous carbonaceous layer having desirable open pores can be obtained by utilizing short carbon fibers as a base material, a binder of thermosetting resin having a specific carbonizing yield, and a pore regulator having a specified particle size and decomposing thermally at a temperature higher than the molding temperature. However, during the calcination process of a shaped article, the exfoliation of a porous carbonaceous layer from a gas impermeable layer (a dense carbonaceous layer) may inevitably take place, and in particular, such exfoliation may result in a low yield in the manufacture of large substrates in spite of an improved planning of the temperature-increasing procedure. Thus, a further improvement of preparation of electrode substrates has been required.

SUMMARY OF THE INVENTION

A main object of the present invention is, accordingly, to provide an electrode substrate for fuel cells without the aforementioned demerits of conventional substrates.

The exfoliation of shaped substrates during the calcination procedure up to at most 3,000° C. may be considered to be due to the difference between thermal expansion of a porous carbonaceous layer and that of a gas impermeable layer or a separator during the temperature-increasing procedure or due to the difference between thermal shrinkages of both layers during the cooling procedure to room temperature after calcination. Such problems will be resolved by utilizing a buffer layer capable of absorbing the expansion and shrinkage in the interface of the layers.

Preferably, a commercially available flexible graphite sheet may be employed in the invention as a buffer material which is significantly impermeable to reactant gases and has a relatively high expansion and shrinkage coefficient and a good adhesion to an adhesive. Such a graphite sheet is prepared by compression molding of so-called expanded graphite particles in which the distance between honeycomb layers of carbon has been increased by acid or thermal treatment of the native graphite. The graphite sheet has a good adhesion since it has scaly surfaces and some gas permeability and therefore it is possible to impregnate it with an adhesive. Further, the sheet is suitable for absorption of the expansion and shrinkage because of flexibility.

According to the present invention, the problem of conventional electrode substrates, that is, the exfoliation of layers, can be avoided and thereby larger electrode substrates may be prepared, by utilizing the flexible graphite sheets which are interposed between a porous carbonaceous layer and a separator in the electrode substrate and bonded with an adhesive capable of carbonizing.

The invention provides a bipolar electrode substrate for fuel cells for use in a stack. The substrate comprises a gas impermeable layer having a three-layer structure which is composed of a carbon plate and two flexible graphite sheets provided on both surfaces of said carbon plate, and two gas diffusionable single or double layers of porous carbonaceous material which are provided on both graphite sheets and have a number of elongated holes for feeding reactant gases into a fuel cell near the center of the thickness of said porous layer. Thus, the substrate has a five or seven-layer structure in which these five layers are integrated as a whole body.

The present invention also provides processes for preparation of such an improved electrode substrate.

BRIEF DESCRIPTION OF THE DRAWINGS

The present invention will be fully described with reference to the attached drawings. Among the drawings.

DESCRIPTION OF THE PREFERRED EMBODIMENTS

Figure 1:
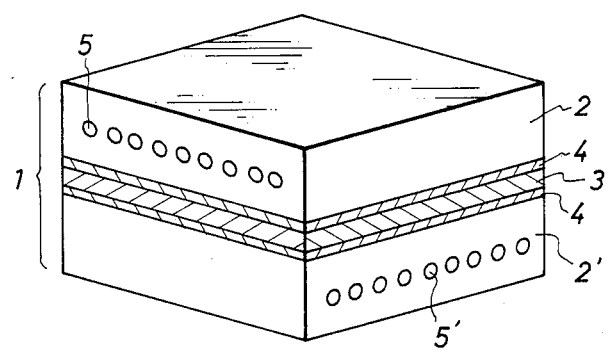
FIG. 1 illustrates the structure of an electrode substrate according to the present invention.
Figure 2:
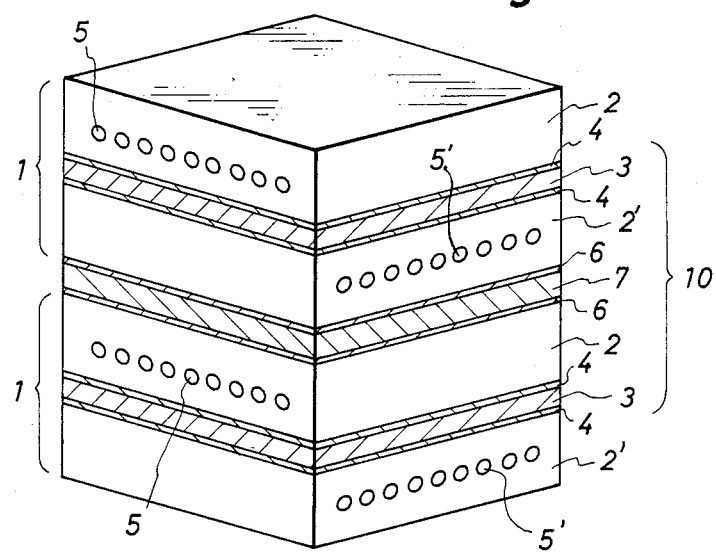
FIG. 2 is a schematic view of a partial construction of a fuel cell comprising two electrode substrates of the invention stacked with two catalyst layers and one matrix layer.

FIG. 1 is an explanatory view of the electrode substrate 1 according to the present invention, and FIG. 2 is an explanatory view of a partial construction of a fuel cell comprising two electrode substrates 1 of the invention, two catalyst layers 6 and one matrix layer 7 impregnated with an electrolyte, stacked with each other as shown. In FIG. 2, a unit cell of a fuel cell is indicated by the numeral 10.

As shown in FIGS. 1 and 2, the electrode substrate 1 of the present invention comprises two porous carbonaceous layers 2, 2', a carbon plate 3, and two flexible graphite sheets 4, each of which is interposed between the porous layer 2 or 2' and the carbon plate 3. Thus, the electrode substrate 1 of the invention has a five-layer structure. These five layers are stacked as shown in FIG. 1 and integrated as a whole body by molding and calcining.

Each of the porous layers 2, 2' has a number of elongated holes 5, 5' near the center of the thickness of the layer 2, 2'. These holes 5, 5' form paths for feeding reactant gases into a fuel cell. They are continuously elongated from one side surface of the electrode substrate 1 to the other opposite side surface thereof. These elongated holes 5, 5' are substantially parallel to each other, and to an electrode surface and one side surface having no openings of the holes which of course differs from the above-said surfaces having openings of the holes. As shown in FIG. 1, the longitudinal direction of the elongated holes 5 in the porous layer 2 on one side of the carbon plate 3 makes approximately right angles to the longitudinal direction of the holes 5' in the porous layer 2' on the other side adjacent over said carbon plate 3. Similarly, the longitudinal direction of the elongated holes 5 in the porous layer 2 on one side of the matrix 7 makes approximately right angles to the longitudinal direction of the holes 5' in the porous layer 2' on the other side adjacent over said matrix 7, as shown in FIG. 2.

The "electrode surface" used herein refers to the uppermost or lowermost surface of the electrode substrate shown in Figures. The "side surface" of the electrode substrate used herein refers to the side surfaces of the substrate or fuel cell, that is, those other than the said electrode surfaces, as shown in Figures.

Each of the elongated holes 5, 5' may have a cross section in any form, for example, rectangular (FIGS. 6 and 7), circular as shown in FIGS. 1 and 2, or in any other form. The cross sectional area of each elongated hole 5, 5' is preferably in the range of from about 0.2 to about 7 mm$^2$. In the holes 5 with a circular cross section as shown in FIGS. 1 and 2, their diameter will be in the range of from 0.5 to 3 mm. On the other hand, when the holes 5 have any cross sectional form other than circular, a diameter of a circle having the same area as their cross sectional area, said diameter being in the above-specified range, may be regarded as an "equivalent diameter" of elongated holes with any cross sectional form other than circular. Holes with smaller sizes will give too high resistance to the feed flow of reactant gases, in cases of fuel cells with a relatively large electrode surface area wherein the lengths of elongated holes will be longer. On the other hand, holes with larger sizes will inevitably cause increase in thickness of porous layers resulting in reduction of the volume efficiency of a fuel cell prepared therefrom.

The porous layer 2 of the electrode substrate 1 as shown in FIG. 1 is uniformly porous and carbonaceous. Preferably, the porous layer 2 has an average bulk density in the range of from 0.4 to 0.8 g/cm$^3$ and a specific gas permeability to reactant gases of 20 ml/cm.hr.mmAq. or more. A porous layer having an average bulk density and a gas permeability in the above-specified ranges, respectively, will have a desired mechanical strength, such as bending strength, and a desired gas diffusion resistance. Preferably, the porosity of the porous layer 2 may be in the range of from 50 to 80%. Pores in the porous layer 2 are open pores, and preferably, 60% or more of the pores have a diameter in the range of from 5 to 50 microns.

Preferably, the flexible graphite sheet 4 of the electrode substrate 1 of the invention has an average bulk density in the range of from 1.0 to 1.35 g/cm$^3$, a gas permeability of 0.2 ml/cm.hr.mmAq. or less and a thickness of 1.0 mm or less. It has been found that a thickness more than 1 mm of the sheet will not be required even if a large electrode substrate would be prepared, although thicker graphite sheets may of course be desirable for absorbing the thermal expansion and shrinkage on calcination of the porous carbonaceous layer 2 and the carbon plate 3.

Such a flexible graphite sheet 4 may be prepared by compression of expanded graphite particles. However, there are fine defects among compressed graphite particles and these defects will allow gases to permeate. In order to further reduce the gas permeability and prevent the sheet's swelling due to penetration of the electrolyte, there are more preferably employed those prepared by impregnating such a graphite sheet with a resol-type phenol resin under reduced pressure in an amount of 0.1-20 parts by weight based on 100 parts by weight of the sheet, and thermosetting under pressure, and optionally further calcining at 800° C. or higher.

The carbon plate 3 of the electrode substrate 1 may preferably have an average bulk density of 1.2 g/cm$^3$ or more and a gas permeability of 0.2 ml/cm.hr.mmAq. or less. When bulk densities are less than 1.0 g/cm$^3$, a desired compactness as a gas impermeable layer cannot be obtained.

The electrode substrate of the invention may be prepared in the following manner.

A material for porous layer, a material for forming elongated holes, a material for porous layer, a pre-combined material for a gas impermeable layer which has individually and previously been prepared by bonding flexible graphite sheets on both sides of a carbon plate with an adhesive material, a material for porous layer, a material for forming elongated holes, and a material for porous layer are supplied, in this order, into a mold having a proper configuration, press molded, postcured and calcined under an inert environment.

The materials for porous layers which may be used in the invention may be mixtures comprising 10-50% by weight of a filler, such as short carbon fibers, carbon particles and the like, 20-40% by weight of a binder, such as phenol resins, epoxy resins, petroleum and/or coal pitches and mixtures thereof, and 20-50% by weight of a pore regulator, such as polyvinyl alcohols, polystyrenes, polyethylenes, polypropylenes, polyvinyl chlorides and mixtures thereof.

Preferably, the short carbon fibers employed as a filler in the invention have a diameter in the range of from 5 to 30 microns and a fiber length in the range of from 0.02 to 2 mm. With carbon fibers having a length of more than 2 mm, the fibers tangle with one another to form a wool-pill in the course of the present process up until press molding and as a result a desired porosity and a desired sharp distribution of pore diameters are not obtained. The required strength of the product is not obtained with carbon fibers having a length of less than 0.02 mm. The linear carbonizing shrinkage of the carbon fibers is in the range of not more than 3.0% when the fibers are calcined at 2,000° C. Larger shrinkages may cause cracks in the product on calcination. Such short carbon fibers having a preferred shrinkage will enable production of a larger electrode substrate.

The binder employed in the invention may be useful for combining the carbon fibers with each other as a carbonaceous binder after carbonizing and, in order to obtain a desired bulk density, is a resin having a carbonizing yield in the range of from 30 to 75% by weight. Such resins include phenol resins, epoxy resins, petroleum and/or coal pitches and mixtures thereof. Powdery phenol resin or a combination thereof with powdery pitch is most preferred in dry blending and it has been found that there can be prepared with such a binder an electrode substrate having excellent properties.

The amount of a binder mixed is in the range of from 10 to 50% by weight, preferably from 20 to 40% by weight. With less than 10% by weight of a binder, the mechanical strength of a resulting substrate will be low due to an insufficient amount of a binder. On the other hand, desired pore diameter and gas permeability are not obtained with more than 50% by weight of a binder.

The pore regulator is an important material for determining pore diameters of a final product. In the invention, organic granules, 70% or more of which have a particle diameter in the range of from 30 to 300 microns, may preferably be employed in order to regulate the bulk density and pore diameters of the product. Such organic granules do not evaporate nor melt-flow at 100° C. In other words, the organic granules may be thermally deformed but should not evaporate nor melt-flow at the temperature and pressure of press molding.

The pore regulator may preferably be selected from polyvinyl alcohols, polyvinyl chlorides, polyethylenes, polypropylenes, polystyrenes and mixtures thereof which have a carbonizing yield of 30% by weight or less. With organic granules having a carbonizing yield of more than 30% by weight it will be difficult to control the porosity and/or pore diameter.

The amount of a pore regulator may be suitably selected from the range of from 20 to 50% by weight depending on the desired bulk density and pore diameters of an electrode substrate.

Preferably, the amounts to be mixed of the filler (A), the binder (B) and the pore regulator (C) will satisfy the following equation:

$$(A+C)/B = 1.5 \text{ to } 4.0$$

wherein the amounts are based on % by weight. Without this range it is difficult to satisfy all the desired properties, such as bulk density, bending strength, gas permeability and electric resistance. When 10-50% by weight of the filler and 20-50% by weight of the pore regulator are used in the invention, the amount of the binder will preferably be in the range of from 20 to 40% by weight.

Examples of the materials for forming elongated holes which may be used in the invention include textile fabrics and grating-like shaped articles of polymers, such as polyethylenes, polypropylenes, polystyrenes, polyvinyl alcohols and polyvinyl chlorides, which preferably have a carbonizing yield (900° C.) of 30% by weight or less. When polymers having larger carbonizing yields are used, it will be difficult to control the formation of elongated holes and their diameters or equivalent diameters. The polymers utilized for forming elongated holes do not evaporate nor melt-flow at 100° C. In other words, the polymers may be thermally deformed but should not evaporate nor melt-flow at the temperature and pressure of press molding.

Figure 3A:
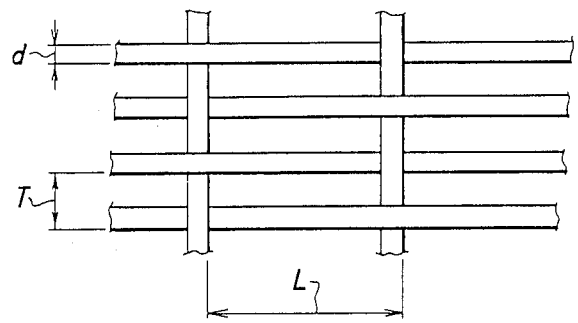
FIGS. 3a and b demonstrate schematically two examples of materials for forming elongated holes used in the invention.

FIGS. 3a and b are two enlarged views illustrating schematically the materials for forming elongated holes: FIG. 3a shows an example of the textile fabrics of polymer and FIG. 3b shows an example of the grating-like shaped articles of polymer.

The textile fabric of polymer shown in FIG. 3a comprises single strands or bundles of a number of single strands which are textured so that the distance (T) between two strands or bundles parallel to the gas flow direction may be in the range of from 1.5 to 5 mm, and the distance (L) between two single strands or bundles perpendicular to the gas flow direction may be in the range of from 5 to 50 mm. The single strand or bundle may preferably have an approximately circular cross section with a diameter (d) in the range of from 0.5 to 3.3 mm.

Figure 3B:
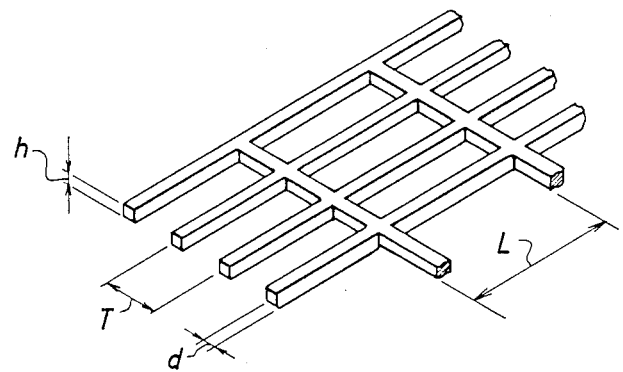

The grating-like shaped articles of polymer as shown in FIG. 3b may be prepared, for example, by extrusion molding a melt of the polymer into a mold, or by press molding pellets or powder of the polymer in a mold. The cross section of a grating may be in any form, for example, circular, rectangular, square, star-like, etc. The cross sectional area of the grating may be approximately equal to the area of a circle having a diameter (equivalent diameter) in the range of from 0.5 to 3.3 mm. For example, in an article having gratings with a rectangular cross section as shown in FIG. 3b, a width (d) in the range of from 0.45 to 2.7 mm and a height (h) in the range of from 0.5 to 3.0 mm are chosen so that the cross sectional area, i.e. d×h, may be equal to that of a circle having a diameter in the range of from 0.5 to 3.3 mm: in other words, an equivalent diameter of the grating may be in the range of from 0.5 to 3.3 mm. The distance (T) between two gratings parallel to the gas flow direction may be in the range of from 1.5 to 5 mm, and the distance (L) between two gratings perpendicular to the gas flow direction may be in the range of from 5 to 50 mm.

In the course of preparation of an electrode substrate according to the invention, the textile fabrics or grating-like shaped articles of polymer may be placed on the material for porous layer in a mold such that elongated holes may be formed near the center of the thickness of the porous layer. Thus, the fabrics or articles will form elongated holes in the porous layer by calcination after postcuring process. A major part of the materials for forming elongated holes will evaporate and dissipate by thermal decomposition, while a small amount of the materials may be carbonized by calcination.

In the present invention, the single strand or bundles of the textile fabric which are parallel to the gas flow direction will contribute to the formation of the elongated holes, while the single strands or bundles perpendicular to the gas flow direction are utilized to link the single strands or bundles parallel to the gas flow direction to each other so that the distance (T) is maintained in the above-specified range. The "gas flow direction" means herein the direction of the flow of the reactant gases in the elongated holes. Similarly, the gratings of the grating-like shaped article which are parallel to the gas flow direction will mainly contribute to the formation of the elongated holes.

Generally, the diameter or equivalent diameter of the elongated holes will be smaller by 3-7% than the original diameter or equivalent diameter of the materials for forming elongated holes when cooled to room temperature after calcination. Thus, a diameter of the single strand or bundles of the starting textile fabric, or a diameter or equivalent diameter of the gratings of the starting shaped article can be selected suitably from the above-mentioned ranges so that a preferable diameter or equivalent diameter of resulting elongated holes may be obtained, considering these contractions.

The materials for forming elongated holes described above are represented only for illustration and not limitingly. Any other suitable materials can also be used for forming elongated holes for feeding reactant gases in the invention.

The flexible graphite sheets which may be used in the invention are those having the above-mentioned properties and obtained by compression molding of commercially available expanded graphite particles. Preferably, there may be employed in the invention those graphite sheets prepared by impregnating such a commercially available graphite sheet with a thermosetting resin having a carbonizing yield of 20% or more, such as resol-type phenol resins and epoxy resins, under reduced pressure of 50 Torr or less, repeating the impregnation procedure several times, hot-pressing, e.g., at 140° C., 1 kg/cm$^2$G for 2 hours, to thermoset the resin, and optionally calcining at 800° C. or higher under an inert environment.

Examples of the adhesive materials for use in the invention are mixtures comprising 0–40% by weight of short carbon fibers having a diameter in the range of from 5 to 30 microns and a length in the range of from 0.02 to 2 mm, and 60–100% by weight of a solution containing a resol-type phenol resin having a carbonizing yield in the range of from 30 to 75% by weight.

The carbon plate which may be used in the invention preferably has an average bulk density of 1.2 g/cm$^3$ or more, a gas permeability of 0.2 ml/cm.hr.mmAq. or less and a thickness of 2 mm or less.

For press molding of these materials, into a mold having a proper configuration, there are supplied the material for porous layer, the material for forming elongated holes, the material for porous layer, a pre-combined material for a gas impermeable layer which has previously been prepared by hot-pressing and bonding the flexible graphite sheets on both sides of the carbon plate with the adhesive material, the material for porous layer, the material for forming elongated holes and the material for porous layer, in this order.

It should be noted that such a pre-combined material for a gas impermeable layer is individually prepared prior to press molding of an electrode substrate in the invention. If otherwise processed, for example, if a flexible sheet, an adhesive material and a carbon plate as well as other materials, such as the materials for porous layers and for forming elongated holes, are fed into a mold and press molded together, there may occur separation of material elements and/or bending of materials (i.e., sheets and/or plates) since it takes some or more time to transmit heat and pressure all over the materials. Particularly, binders and/or pore regulators in the materials for porous layers may be separated from one another or flexible graphite sheets may bend, and therefore, uniformly shaped articles cannot be obtained. Thus, the present inventors have found in the course of our investigations that, if an impermeable material having a three-layer structure comprising a carbon plate and two flexible graphite sheets is individually and previously prepared by hot-pressing, the aforementioned problems can be resolved and a uniformly shaped article can be obtained.

The previously combined material for a gas impermeable layer which can preferably be used in the invention may be prepared by supplying a flexible graphite sheet, an adhesive material, a carbon plate, an adhesive material and a flexible graphite sheet, in this order, into a mold having a proper configuration, and hot-pressing at a mold temperature in the range of from 120° to 160° C. and a molding pressure in the range of from 10 to 50 kg/cm$^2$G for a pressure holding time in the range of from 10 to 40 minutes, typically at 140° C., 30 kg/cm$^2$G for 20 minutes These materials are then cut into smaller articles depending on the size of a mold. For preparing these preliminarily treated materials, there may be utilized the mold and press molding machine used for press molding of an electrode substrate.

The press molding conditions of the electrode substrates of the invention are a mold temperature in the range of from 70° to 170° C., a molding pressure in the range of from 5 to 100 kg/cm$^2$G and a pressure holding time period in the range of from 1 to 60 minutes.

After press molding, the molded product is postcured at the mold temperature for at least 2 hours, and then calcined under an inert environment at a temperature in the range of from 800° to 3,000° C. for about one hour. In this procedure, the temperature may preferably be increased slowly, e.g. in a rate of 100°±50° C. per hour, upto about 700° C., so that any stress may not be generated, which is due to sudden shrinkage in the thermal decomposition at low temperatures. Such stress would cause exfoliation of layers and/or cracks.

In another process of the invention, an electrode substrate may be prepared by supplying a material for porous layer, a material for forming elongated holes, a material for porous layer and a flexible graphite sheet, in this order, into a mold having a proper configuration, pre-press molding at a temperature in the range of from 60° to 100° C. and a pressure in the range of from 20 to 50 kg/cm$^2$G for a time period in the range of from 10 to 30 minutes, typically at 80° C., 30 kg/cm$^2$G for 20 minutes, repeating these procedures to obtain two same pre-pressed products, supplying one of the products into a mold having a proper configuration with the flexible graphite sheet being on upper side, placing a carbon plate, both surfaces of which have been coated with an adhesive material, supplying the another pre-pressed product with the flexible graphite sheet being faced onto the carbon plate, press molding at a temperature in the range of from 120° to 160° C. and a pressure in the range of from 20 to 50 kg/cm$^2$G for a time period in the range of from 10 to 30 minutes, typically at 130° C., 40 kg/cm$^2$G for 20 minutes, postcuring and calcining. Procedures and materials in this process are substantially same as above-described.

Table 1 shows the properties of the substrates according to the present invention as well as those according to the prior art (monopolar type electrode substrate with ribs) and the present inventors' Japanese Patent Application Laying Open No. 68170/84 (bipolar type electrode substrate of three-layer structure). As shown in Table 1, the electrode substrate of the present invention exhibits an improved mechanical strength, for example, bending strength. Further, a thinner substrate may be prepared, resulting in a shorter diffusion path or a lower resistance to diffusion of reactant gases and a larger current density. On the other hand, no conventional separator sheet is required for stacking unit cells to make a fuel cell since a separator is incorporated and integrated in the substrate of the invention. In addition, there is no electric nor thermal contact resistance between the separator and the porous layer in the substrate of the invention.

TABLE 1

|  | prior art (monopolar) | three-layer bipolar* | present invention (bipolar) |
|---|---|---|---|
| thickness of substrate (mm) | 2.4 | 3.6[1] | 4.2 |
| thickness of a cell (mm) | 5.8[2] | 4.1[3] | 4.7[8] |
| bending strength (kg/cm$^2$) | 100 | 250 | 250 |
| compressive strength (kg/cm$^2$) | 100 | 110 | 140 |
| electric[4] resistance   substrate (mΩ) | 8 | 10 | 18 |
| contact resistance[5] | 30 | — | — |
| total of a cell | 77[6] | 10 | 18 |
| thickness for gas diffusion (mm) | 1.2 | 0.5 | 0.5 |
| limiting current (mA/cm$^2$) | 400 | 500 | 500 |
| volumetric power (kW/m$^3$)[7] | 207 | 298 | 255 |

Notes:
*Japanese Patent Application Laying Open No. 68170/84
[1] two porous layers (each 1.5 mm) + separator (0.6 mm)
[2] separator sheet (0.5 mm) + two substrates + matrix (0.5 mm)
[3] substrate + matrix (0.5 mm)
[4] resistance per 1 cm$^2$
[5] resistance measured at contact pressure of 1 kg/cm$^2$G
[6] separator sheet (1 mΩ) + two substrates + two contact resistances
[7] measured at 200 mA/cm$^2$
[8] substrate + matrix (0.5 mm)

Table 2 shows test results of exfoliations. As seen from Table 2, when no graphite sheet is incorporated between the porous layer and the separator (three-layer substrate of Japanese Patent Application Laying Open No. 68170/84), exfoliations may more frequently occur as the size of substrates is larger resulting in a low yield of larger electrode substrates. On the other hand, exfoliation may hardly occur even in the manufacture of larger substrates according to the present invention.

TABLE 2

|  | exfoliation frequency (%) | | | | raw material |
|---|---|---|---|---|---|
| substrate size (mm square) | 100 | 170 | 350 | 650 | |
| Jap. Pat. Appln. Laying Open No. 68170/84 (three-layer) | 5 | 20 | 45 | 75 | carbon plate (0.6 mm-t) + two porous layers (each 1.5 mm-t) |
| present invention (five-layer) | 0 | 0 | 3 | 8 | carbon plate (0.8 mm-t) + two graphite sheets (each 0.3 mm-t) + two porous layers (each 1.4 mm-t) |

The electrode substrates of the present invention are suitably utilized for making a fuel cell by stacking them as shown in FIG. 2. On operation of such a fuel cell, however, the reactant gases may also diffuse out from the side surfaces having no openings of the elongated holes of the porous layers of the electrode substrates in the fuel cell, which may cause dangers of mixing of the gases by the side surfaces.

Figure 4:
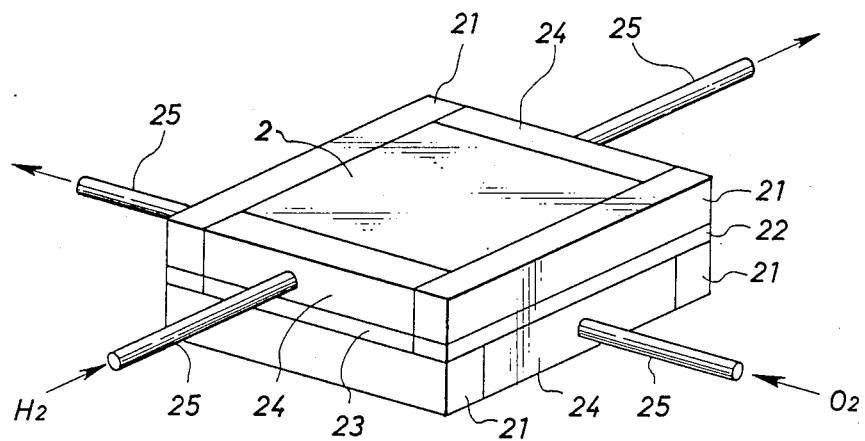
FIG. 4 demonstrates schematically a partial construction of a fuel cell as practically used in operation.

In order to prevent such dangers, the electrode substrates are generally impregnated with a fluorocarbon resin in the peripheral regions thereof, or alternatively, provided with a number of peripheral members, for example, as shown in FIG. 4. In FIG. 4, peripheral sealing members 21, 22, 23 are made of a material having a good insulation to gas diffusion, a thermal resistance at about 200° C. on operation of a fuel cell, and a good resistance to corrosion of 100% phosphoric acid, for example, Teflon ® (trade mark of Du Pont Corp., U.S.A.), silicon carbide, ceramics, or a suitable material coated with Teflon ® or silicon carbide. Further, gas manifolds 24 are provided with a tube 25 for introducing reactant gases into the elongated holes for feeding the gases to the porous layer 2.

Recently, there have been developed separators integrated with such peripheral members for sealing the reactant gas diffusion from the side surfaces of a fuel cell.

Figure 5:
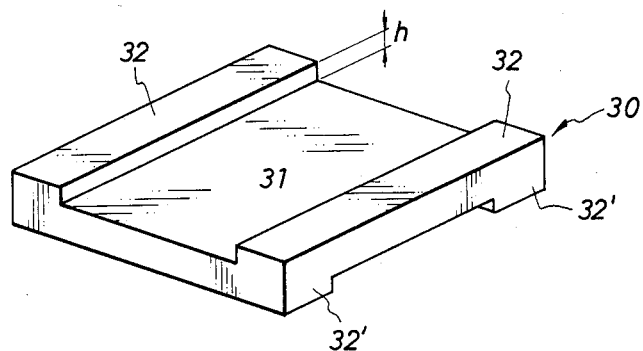
FIG. 5 illustrates another example of the separator which may be used in the invention.

One preferred example of such separators having peripheral members which may preferably be used in the present invention is illustrated in FIG. 5, wherein a separator 30 comprises a gas impermeable separator plate 31 and peripheral sealing members 32, 32', the plate and members being integrated as a whole body by calcination.

As shown in FIG. 5, a pair of peripheral sealing members 32 or 32' are provided on each side of the separator plate 31, and the longitudinal direction of the members 32 is perpendicular to the longitudinal direction of those 32'.

The separator plate 31 will be thick enough to separate reactant gases from one another but should not be too thick. Generally, the thickness if 1.5 mm or less.

The separator 30 has a gas permeability in the direction of the thickness of $10^{-4}$ cm$^2$/hr.mmAq. or lower. Additionally, the separator 30 may preferably have a bending strength of 500 kg/cm$^2$ or higher, a thermal conductivity of 4 kcal/m.hr.° C. or higher, and an electric resistance of 10 mΩ.cm or lower. Thus, the separator 30 is excellent in gastightness, mechanical strength and thermal and electrical conductivities.

The height (h) of the peripheral sealing member 32, 32' corresponds to the thickness of a porous layer for reactant gases to diffuse therein, for example, the porous layer 2 shown in FIG. 1, and is generally 2.5 mm or smaller. The permeability of the sealing member 32, 32' is sufficiently low, generally $10^{-2}$ cm$^2$/hr.mmAq or lower, to prevent the reactant gas diffusion through the member to the outside.

Such a separator may be prepared in the following manner.

In one preferred process, after a shaped product for a separator plate and four shaped plates for peripheral sealing members are separately prepared by pre-pressing, these plates are press molded in a mold with a proper configuration and calcined at a temperature of 1,000° C. or higher.

The raw material used in this process may be those mixtures comprising 50-90% by weight, preferably 60-80% by weight, of a carbonaceous filler and 10-50% by weight, preferably 20-40% by weight, of a binder.

The carbonaceous filler which may be preferably used is selected from non-graphitizable carbonaceous particles, such as calcined pieces of oxydized pitch, carbon fiber pieces, calcined phenol particles and the like. The carbonaceous particles have an average diameter of 40 microns or less, preferably 10 microns or less. The preferred materials for the filler are those obtained by calcining and breaking into pieces oxidized pitches prepared by the methods described in, e.g. Japanese Patent Publication No. 31116/78. Any mixtures of the aforementioned particles can be also employed.

The binder is preferably a phenol resin.

The mixture is pre-pressed in an appropriate mold to prepare a shaped product for a separator plate or a shaped plate for peripheral sealing members.

The pre-pressing conditions are a molding temperature in the range of from 70° to 130° C., preferably from 100° to 120° C., a molding pressure in the range of from 30 to 200 kg/cm$^2$G, preferably from 80 to 150 kg/cm$^2$G, and a time period for molding in the range of from 5 to 30 minutes.

The shaped product for a separator plate and four shaped plates for peripheral sealing members thus pre-pressed are then press molded in a mold having a proper configuration (see FIG. 5). The press molding is carried out at a temperature in the range of from 120° to 200° C., preferably from 130° to 160° C., and a pressure in the range of from 30 to 200 kg/cm$^2$G, preferably from 80 to 150 kg/cm$^2$G, for a time period in the range of from 10 to 20 minutes.

After press molding, the molded product can be post-cured at a temperature in the range of from 130° to 160° C. and a pressure of 0.5 kg/cm$^2$G or lower for at least 2 hours.

The thus obtained product is then calcined at a temperature of 1,000° C. or higher.

In another process, the separators can be prepared by supplying the raw material mixture into a mold with a proper configuration so as to obtain a desired shape as shown in FIG. 5, press molding under the above conditions, or alternatively, injection molding into such a mold as above at an extrusion temperature in the range of from 120° to 200° C. and an extrusion pressure in the range of from 200 to 500 kg/cm$^2$G, and then, optionally but preferably postcuring, and calcining at 1,000° C. or higher.

Figure 6:
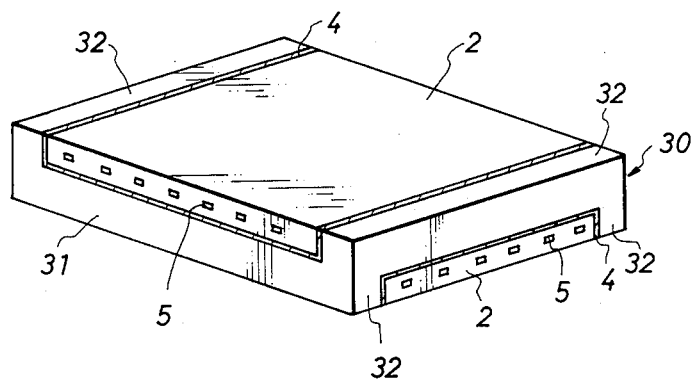
FIG. 6 illustrates the structure of the electrode substrate comprising the separator shown in FIG. 5.

Such a separator integrated with peripheral sealing members can be used to make a fuel cell electrode substrate as shown in FIG. 6, wherein a porous layer 2 may be any porous layer, for example, any one of those prepared by methods described in Japanese Patent Application Laying Open Nos. 117649/83, 37662/84, 46763/84, 63664/84, 66063/84 and 96661/84.

In FIG. 6, a flexible graphite sheet 4 is interposed between the separator 30 and the porous layer 2 and integrated as a whole body by calcination. The porous layer 2 has a number of elongated holes 5.

The electrode substrates as shown in FIG. 6 may be prepared in almost the same manner as described herein.

As integrated in a whole body, the thermal and electric resistances may be significantly improved or reduced in the peripheral regions of the substrates as shown in FIG. 6, while at the same time no conventional peripheral member for sealing is required therein.

Figure 7:
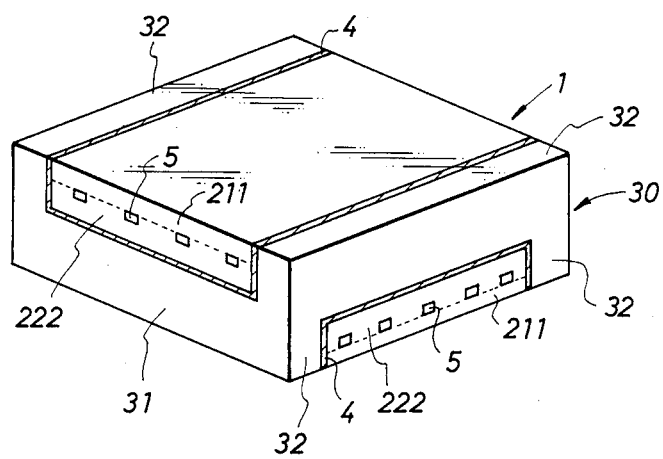
FIG. 7 illustrates the structure of another electrode substrate comprising the separator shown in FIG. 5 and porous layers of two-layer structure.

FIG. 7 shows the structure of one specific embodiment of the electrode substrates comprising such a separator as shown in FIG. 5. As shown in Figure, the electrode substrate 1 comprises a separator 30 and two porous layers 211, 222. The separator 30 is composed of a separator plate 31 and four peripheral sealing members 32. Each porous layer 211, 222 has a number of elongated holes 5 for feeding reactant gases near the center of the thickness of each layer. A flexible graphite sheet 4 is also interposed between the porous layer 222 and the separator 30.

In this embodiment, the diameter or equivalent diameter of the elongated holes 5 may be preferably in the range of from 0.5 to 1.5 mm.

The porous layer comprises a more porous layer 211 and a less porous layer 222 which has a bulk density larger than that of the more porous layer 211.

The more porous layer 211 has an average bulk density in the range of from 0.4 to 0.8 g/cm$^3$, a gas permeability of 20 ml/cm.hr.mmAq. or more and a porosity in the range of from 50 to 80%. The porous layer 211 has open pores, 60% or more of which have a diameter in the range of from 10 to 100 microns.

Preferably, the less porous layer 222 has an average bulk density in the range of from 0.5 to 1.0 g/cm$^3$. Since the permeability of the less porous layer 222 to reactant gases is significantly low, the reactant gases will substantially diffuse only through the more porous layer 211 and the length for the gases to pass through will be significantly reduced. Further, the mechanical strength, e.g. bending strength, of the electrode substrate 1 may be markedly improved.

The graphite sheet 4 is the same as described hereinabove. The sheets 4 are integrated with the porous layers 211, 222 and the separator 30 as a whole body, as shown in FIG. 7.

The porous layers in this embodiment may be prepared in the following manner.

The less porous layer is prepared from a shaped plate having a number of grooves for elongated holes.

There is first prepared a mixture comprising 100 parts by weight of short carbon fibers, 20-100 parts by weight of a binder resin and 0-100 parts by weight of granular polymer substance having a predetermined diameter distribution as a pore regulator. Examples of the short carbon fibers are those carbon fibers calcined at 2,000° C. and having an average fiber length of 1.0 mm or less. Binder resins include phenol resins having an average particle diameter of 100 microns or less and a carbonizing yield of 30% by weight or more. Preferable pore regulators are polyvinyl alcohol particles which do not evaporate nor melt-flow at 100° C. and 70% or more of which have a diameter in the range of from 30 to 300 microns. These materials are disclosed in, for example, Japanese Patent Application Laying Open No. 96661/84.

The mixture is then press molded in a mold having a proper configuration at a temperature in the range of from 70° to 130° C. and a pressure in the range of from 20 to 100 kg/cm$^2$G for a time period in the range of from 1 to 30 minutes, to prepare a shaped plate having grooves.

Then, a flat plate for a more porous layer is prepared from a mixture comprising 100 parts by weight of short carbon fibers, 20-100 parts by weight of a binder resin and 40-100 parts by weight of granular polymer substance having a predetermined diameter distribution as a pore regulator. Examples of the materials are shown above.

The mixture is then press molded under the same conditions as described above to prepare a flat plate.

A graphite sheet is first placed in a mold having a proper configuration. Then, the shaped plate having grooves is placed in a mold with the grooves being on upper side, and, the flat plate is then placed on the shaped plate, and press molded at a temperature in the range of from 130° to 160° C. and a pressure in the range of from 20 to 100 kg/cm$^2$G for a time period in the range of from 1 to 60 minutes.

After press molding, the product is preferably post-cured at the molding temperature for about 2 hours or more.

A phenolic adhesive is applied on the graphite sheet of the thus prepared shaped article for a porous layer. The article is then placed into a mold with the graphite sheet being upper, and thereafter, a separator which has been prepared individually, and then another shaped article for a porous layer are placed with the graphite sheet being contacted with the separator. These materials are then press molded at a temperature in the range of from 130° to 160° C. and a pressure in the range of from 1 to 30 kg/cm$^2$G for a time period in the range of from 5 to 60 minutes. After postcuring at the molding temperature for about 2 hours or more, the product is calcined at 1,000° C. or higher.

In this electrode substrate, the permeability of the less porous layer to reactant gases is significantly low, and therefore, the reactant gases will substantially diffuse only through the more porous layer. Further, the thermal and electric resistances in the total substrate are advantageously reduced.

EXAMPLES

The present invention will be illustrated while referring to the following non-limiting examples. It should be understood that various modifications and variations may be made by those skilled in the art without undue experimentation and such modifications and variations will be included in the scope of the present invention.

In these examples, the "porosity P(%)" was determined by the following equation while assuming that the real density of a carbonaceous substrate was 1.6 g/cm$^3$:

$$P = (1 - \rho_b/1.6) \times 100$$

wherein $\rho_b$ is a measured bulk density (g/cm$^3$) of a specimen; the "bending strength (kg/cm$^2$)" of a carbonaceous shaped article was determined according to Japanese Industrial Standards (JIS) K-6911/1970 while using a specimen with a dimension of 100×10×2.5 mm; and the "average pore diameter ($\mu$m)" of a specimen was measured by a mercury porosimeter (manufactured by Carlo Erba Strumentazione, Italia). The "specific gas permeability $Q_s$ (ml/cm.hr.mmAq.)" was determined in the following manner: a cylindrical specimen of 90 mm in diameter and t mm in thickness was cut out from a shaped article to be measured, the circumferential side surface of the specimen was coated with a thermosetting resin so that gas should not diffuse out therethrough, both longitudinal end surfaces of the specimen were then put between two cylindrical gas tubes with flange holding a gasket, a predetermined amount (10 l/min) of air was supplied from one end of the specimen to the other end thereof which was open to the atmosphere, the pressure loss between two ends of the specimen was measured by a manometer attached to the upstream of the gas tube and the specific gas permeability $Q_s$ was then calculated by the following equation:

$$Q_s = \frac{6 \times t \times 10^4}{50.24 \times \Delta p}$$

wherein $\Delta p$ is a measured pressure loss (mmAq.) and 50.24 cm$^2$ is the real area to be measured (a circle of 80 mm in diameter). Further, the "volume resistivity $\rho_v(\Omega cm)$" was determined in the following manner: both ends of a specimen were coated with an electroconductive material and an electrical resistance between two ends of the specimen was measured according to SRIS (Standards of Japan Rubber Association) 2301-1969, and then the volume resistivity was calculated by the following equation:

$$\rho_v = R \cdot w \cdot t / l$$

wherein R is a measured resistance ($\Omega$) between two ends of the specimen, l (cm) is a longitudinal length (in the direction to be measured), and w (cm) and t (cm) are a horizontal and a vertical lengths, respectively, defining a cross section of the specimen.

EXAMPLE 1

Preparation of Grating-like Shaped Articles of Polypropylene

Pellets of polypropylene, J-215 by TONEN SEKIYUKAGAKU K. K., Japan, were melt extruded through a screw-injection molding machine at 230° C., 500 kg/cm$^2$ into a stainless steel mold having a proper configuration held at about 50° C.

There were prepared grating-like shaped articles of polypropylene as shown in FIG. 3b but they had gratings with circular cross section of 0.85 mm in diameter, T=2.5 mm, L=40 mm.

These articles were used as materials for forming elongated holes for feeding reactant gases in the following examples.

EXAMPLE 2

Preparation of Electrode Substrate

Into a mold with a proper configuration, there was supplied a mixture for porous layer comprising 40% by weight of short carbon fibers, M104S by Kureha Kagaku Kogyo Co., Ltd., 0.4 mm in average fiber length and 14 μm in average diameter, 30% by weight of fine particles of polyvinyl alcohol as a pore regulator, The Nippon Gosei Kagaku Kogyo Co., Ltd., Japan, 180 μm in average particle diameter, and 30% by weight of phenol resin as a binder, Asahi Yukizai Co., Ltd., Japan.

On the mixture, there were supplied the grating-like shaped article of polypropylene for forming elongated holes for feeding reactant gases, prepared in Example 1, and then the mixture for porous layer, same as above. There was further supplied on the materials a material for a gas impermeable layer which had been previously prepared.

The material for a gas impermeable layer had been prepared in the following manner: into a mold, a flexible graphite sheet, UCC, GRAFOIL ®, an adhesive material comprising 15% by weight of carbon fibers, 0.1 mm in average fiber length obtained by a ball mill treatment of the carbon fibers described above, and 85% by weight of a resol-type phenol resin adhesive, PL-2801, GUN-EI KAGAKU Co., Ltd., JAPAN, a carbon plate, Toyo Carbon Co., Ltd., Japan, 0.6 mm in thickness, the adhesive material, same as above, and the flexible graphite, same as above, were supplied, in this order, and hot pressed at 140° C., 30 kg/cm$^2$G for 20 minutes.

On the material for a gas impermeable layer in the mold, there were supplied the mixture for porous layer, same as above, the material for forming elongated holes, same as above, and finally the mixture for porous layer, same as above, in this order.

These materials were press molded at 130° C., 40 kg/cm$^2$G for 20 minutes, postcured at 130° C. for about 2 hours, and, after heating slowly by 100° C. per hour upto 700° C., calcined under nitrogen at 2,000° C. for one hour.

There was obtained an electrode substrate having a five layer structure as shown in FIG. 1, and elongated holes had circular cross sections of about 0.8 mm in diameter. The physical properties of the substrate are shown in Table 3.

TABLE 3

|  | gas impermeable layer | | porous layer |
|---|---|---|---|
|  | carbon plate | graphite sheet | |
| thickness (mm) | 1.2 | 0.6 | 1.5[3] |
| bulk density (g/cm$^3$)[1] | 0.6 | — | 0.58 |
|  | 1.45 | 1.22 | |
| porosity (%)[1] | — | — | 64 |
| specific gas permeability (ml/cm.hr. mmAq.) | 0.018 | — | 110 |
| average pore diameter[1] (micron) | — | — | 30 |
| bending strength (kg/cm$^2$) |  | 250[2] | |
| volume resistivity ($\Omega \cdot$ cm) |  | $18 \times 10^{-3[2]}$ | |
| thermal conductivity (kcal/m.hr. °C.) |  | 1.8 | |

Notes:
[1] exclusive of holes
[2] corresponding to one substrate 1 in FIG. 2 corresponding to one porous layer 2 in FIG. 2

EXAMPLE 3

The graphite sheet of Example 2, the mixture for porous layer of Example 2, the material for forming elongated holes prepared in Example 1, and the mixture for porous layer of Example 2 were supplied into a mold with a proper configuration, pressed at 80° C., 30 kg/cm$^2$G for 20 minutes, and removed out of the mold. The same procedures were repeated to prepare another pre-press molded product.

One of the pre-pressed products was placed in a mold with the graphite sheet being on upper side. A carbon plate similar to one of Example 2, on both surfaces of which the adhesive material of Example 2, was placed, and then the other pre-pressed product was placed with the graphite sheet being faced onto the carbon plate.

These materials were press molded at 140° C., 40 kg/cm$^2$G L- for 20 minutes, and postcured at 140° C. for about 2 hours. The temperature of the molded product was increased slowly in a rate of 100° C. per hour upto 700° C. Thereafter, the product was calcined at 2,000° C. for one hour under nitrogen environment.

There was obtained an electrode substrate which had the structure and properties similar to that of Example 2.

EXAMPLE 4

Preparation of Separators with Peripheral Sealing Members

Oxydized pitches with an average particle diameter of 10 microns or less, which had been prepared according to the method described in Japanese Patent Publication No. 31116/78, were calcined at 800° C. and broken into pieces having an average particle diameter of 10 microns or less.

A mixture for separator was prepared by blending 70% by weight of the calcined pieces of oxidized pitch and 30% by weight of phenol resin, RM-210 by Asahi Yukizai Co., Ltd., Japan, in a vane mixer.

The mixture was supplied into a mold of a proper configuration and pressed at 90° C., 100 kg/cm$^2$G to prepare a thin separator plate.

In another mold of a proper configuration, the mixture described above was fed and pressed at 90° C., 100 kg/cm$^2$G. Thus, a shaped plate for peripheral sealing members was prepared, which was cut into smaller plates for each peripheral sealing member with a desired size.

The separator plate and four peripheral sealing member plates prepared above were placed in a mold with a proper configuration so that a desired structure as shown in FIG. 5 would be obtained, pressed at 150° C., 100 kg/cm$^2$G, postcured at about 150° C., 0.4 kg/cm G, and calcined at 1,200° C.

The properties of the resulting separator having peripheral sealing members integrated with the separator plate were as follows:

| | |
|---|---|
| specific gas permeability at N$_2$ of 0.2 kg/cm$^2$G | 4.8 × 10$^{-7}$ cm$^2$/hr. mmAq. (excluding holes); |
| electric resistance | 7.6 mΩ · cm; |
| thermal conductivity | 4.7 kcal/m.hr. °C.; |
| bending strength | 860 kg/cm$^2$; |
| thickness of separator plate | 0.9 mm; |
| height of peripheral sealing member | 2.0 mm; |
| gas permeability towards side surface at N$_2$ of 0.2 kg/cm$^2$G | 1.4 × 10$^{-3}$ cm$^2$/hr. mmAq. |

EXAMPLE 5

Preparation of Separators with Peripheral Sealing Members

Oxydized pitches with an average particle diameter of 10 microns or less, which had been prepared according to the method described in Japanese Patent Publication No. 31116/78, were calcined at 800° C. and broken into pieces having an average particle diameter of 10 microns or less.

A mixture for separator was prepared by blending 65% by weight of the calcined pieces of oxidized pitch and 35% by weight of phenol resin, RM-210 by Asahi Yukizai Co., Ltd., Japan, in a vane mixer.

The mixture was supplied into a mold of a proper configuration and pressed at 120° C., 100 kg/cm$^2$G to prepare a thin separator plate.

In a similar manner, a shaped plate for peripheral sealing members was prepared, and cut into smaller plates for each peripheral sealing member with a desired size.

The separator plate and four peripheral sealing member plates prepared above were placed in a mold with a proper configuration so that a desired structure as shown in FIG. 5 would be obtained, pressed at 150° C. 50 kg/cm$^2$G, postcured at about 150° C., 0.4 kg/cm$^2$G, and calcined at 1,200° C.

The properties of the resulting separator having peripheral sealing members integrated with the separator plate were as follows:

| | |
|---|---|
| specific gas permeability at N$_2$ of 0.2 kg/cm$^2$G | 4.8 × 10$^{-7}$ cm$^2$/hr. mmAq. (excluding holes); |
| electric resistance | 7.6 mΩ · cm; |
| thermal conductivity | 4.7 kcal/m.hr. °C.; |
| bending strength | 860 kg/cm$^2$; |
| thickness of separator plate | 0.9 mm; |
| height of peripheral sealing member | 2.0 mm; |
| gas permeability towards side surface at N$_2$ of 0.2 kg/cm$^2$G | 1.4 × 10$^{-3}$ cm$^2$/hr. mmAq. |

EXAMPLE 6

Preparation of Seven Layer Electrode Substrates

Into a mold with a proper configuration, there was supplied a mixture comprising 100 parts by weight of short carbon fibers, M-204S by Kureha Kagaku Kogyo Co., Ltd., 0.4 mm in average fiber length, 60 parts by weight of fine particles of polyvinyl alcohol as a pore regulator, The Nippon Gosei Kagaku Kogyo Co., Ltd., Japan, and 60 parts by weight of phenol resin as a binder, RM-210 by Asahi Yukizai Co., Ltd., Japan, and the mixture was pressed at 120° C., 40 kg/cm$^2$G for 20 minutes to obtain a shaped plate having a number of grooves.

On the other hand, a mixture comprising 100 parts by weight of short carbon fibers, same as above, 100 parts by weight of polyvinyl alcohol, same as above, and 40 parts by weight of phenol resin, same as above, were supplied into a mold with a proper configuration, and press molded under the same conditions as above to obtain a flat plate.

Into a mold of a proper configuration, there were supplied a graphite sheet, UCC, GRAFOIL ®, 0.3 mm in thickness, the shaped plate prepared above with the grooves being upper, and the flat plate. These materials were press molded at 150° C., 40 kg/cm$^2$G for 40 minutes and postcured at 150° C. for 2 hours.

After applying a phenol-type adhesive on the surface of the graphite sheet, the molded article was placed in a mold with the graphite sheet being on the upper side. On the article was placed the separator prepared in Example 5 was placed so that the article was engaged between a pair of the peripheral sealing members of the separator. Thereafter, another article prepared above was placed on the separator with the graphite sheet being contacted to the separator. The graphite sheet had been coated with a phenol-type adhesive. Thus, two shaped articles and the separator were engaged with one another as shown in FIG. 7.

After press molding at 150° C., 25 kg/cm$^2$G for 40 minutes, the product was postcured at 150° C. for 2 hours and calcined at 1,000° C. or higher.

The physical properties of the resulting electrode substrate are shown in Table 4.

TABLE 4

| | porous layer | | |
| --- | --- | --- | --- |
| | more porous | less porous* | separator |
| thickness (mm) | 0.5 | 1.5 | 0.9 |
| bulk density (g/cm$^3$) | 0.44 | 0.75 | 1.65 |
| porosity (%) | 69 | 61 | — |
| specific gas permeability (cm$^2$/hr. mmAq.) | $5.5 \times 10^3$ | — | $4.8 \times 10^{-7}$ |
| bending strength (kg/cm$^2$) | | 110 | 860 |
| volume resistivity (mΩ · cm) | | 30 | 7.6 |
| thermal conductivity (kcal/m.hr. °C.) | | 1.5 | 4.7 |

Note:
*including graphite sheet

What is claimed is:

1. An electrode substrate for fuel cells comprising: a gas impermeable layer which is composed of a carbon plate and two flexible graphite sheets provided on both sides of said carbon plate; and two porous carbonaceous layers which are provided on both sides of said graphite sheets and which have each a number of elongated holes for feeding reactant gases into a fuel cell provided near the center of the thickness of said porous layer.

2. The electrode substrate of claim 1, in which the elongated holes are parallel to each other and to the electrode surface and one side surface of the electrode, and are continuously elongated in the porous layer from one of the other side surfaces to another side surface opposite thereto; the longitudinal direction of the elongated holes in the porous layer on one side of the impermeable layer is perpendicular to the longitudinal direction of the elongated holes in the other porous layer; and each of the elongated holes has a diameter or equivalent diameter in the range of from 0.5 to 3 mm.

3. The electrode substrate of claim 1, in which the porous layer has an average bulk density in the range of from 0.4 to 0.8 g/cm$^3$, a porosity in the range of from 50 to 80% and a gas permeability of 20 ml/cm.hr.mmAq. or more; and 60% or more of open pores in the porous layer have a diameter in the range of from 5 to 50 microns.

4. The electrode substrate of claim 1, in which the carbon plate has an average bulk density of 1.2 g/cm$^3$ or more, a gas permeability of 0.2 ml/cm.hr.mmAq. or less and a thickness of 2 mm or less.

5. The electrode substrate of claim 1, in which the flexible graphite sheet has an average bulk density of 1.0 g/cm$^3$ or more, a gas permeability of 0.2 ml/cm.hr.mmAq. or less and a thickness of 1.0 mm or less.

6. The electrode substrate of claim 1, in which the carbon plate comprises a gas impermeable carbonaceous separator plate and two pairs of gas impermeable carbonaceous peripheral sealing members, each pair of the members being provided on either side of said separator plate; the longitudinal direction of one pair of the members is perpendicular to that of the other pair of the members; the carbon plate has a gas permeability of $10^{-4}$ cm$^2$/hr.mmAq. or less, a bending strength of 500 kg/cm$^2$ or more, a thermal conductivity of 4 kcal/m.hr.° C. or more and an electric resistance of 10 mΩ.cm or less; and the peripheral sealing member has a gas permeability in the direction towards a side surface of the carbon plate of $10^{-2}$ cm$^2$/hr.mmAq. or less.

7. The electrode substrate of claim 6, in which the separator plate has a thickness of 1.5 mm or less.

8. The electrode substrate of claim 6, in which the peripheral sealing member has a height of 2.5 mm or less.

9. The electrode substrate of claim 6, in which the porous layer comprises a more porous layer, a less porous layer having a bulk density larger than that of said more porous layer and a number of elongated holes for feeding reactant gases provided in the interface between said more porous layer and said less porous layer.

10. The electrode substrate of claim 9, in which the more porous layer has an average bulk density in the range of from 0.4 to 0.8 g/cm$^3$ and a gas permeability of 20 ml/cm.hr.mmAq. or more, and 60% or more of open pores in the more porous layer have a diameter in the range of from 10 to 100 microns.

11. The electrode substrate of claim 9, in which the less porous layer has an average bulk density in the range of from 0.5 to 1.0 g/cm$^3$.

* * * * *